United States Patent [19]

Aoyama

[11] 4,311,945
[45] Jan. 19, 1982

[54] DECELERATION METHOD OF DRIVING SOURCE IN LOCATION CONTROL

[75] Inventor: Tadamasa Aoyama, Yokohama, Japan

[73] Assignee: Kabushiki Kaisha Senesu Shoko, Yokohama, Japan

[21] Appl. No.: 74,007

[22] Filed: Sep. 10, 1979

[30] Foreign Application Priority Data

May 25, 1979 [JP] Japan ................. 54/64001

[51] Int. Cl.³ ............................. G05B 13/00
[52] U.S. Cl. ................... 318/561; 318/615; 408/11
[58] Field of Search ........ 318/561, 603, 460, 615–618, 318/128; 408/11

[56] References Cited

U.S. PATENT DOCUMENTS

| 3,721,882 | 3/1973 | Helms | 318/603 |
| 3,809,986 | 5/1974 | Visser | 318/561 |
| 3,876,873 | 4/1975 | Slawson | 318/561 |
| 4,025,839 | 5/1977 | Maury | 318/632 |
| 4,031,443 | 6/1977 | Droux et al. | 318/561 |
| 4,099,112 | 7/1978 | Klinger | 318/561 |

OTHER PUBLICATIONS

"Position Control Servomechanism" by J. W. Leggate, IBM T.D.B., vol. 16, No. 6, Nov. 1973, pp. 1907–1909.

Primary Examiner—B. Dobeck
Attorney, Agent, or Firm—L. Lawton Rogers, III

[57] ABSTRACT

In carrying out location control of a control object by decelerating a driving source for the control object over a suitable number of stages, this invention is based on the conception that inertia and strain occur in the control object, the driving source keeping such output as to allow a uniform motion of the control object and transmission mechanisms connecting them due to the uniform motion of the control object in a preceeding stage, and they exert significant influences over the location accuracy of the control object and wearing of the machine. In the present invention, therefore, the driving source of the control object is brought under deceleration control at such a timing where the strain occurring in the control object and its associated mechanisms becomes minimum.

6 Claims, 3 Drawing Figures

DECELERATION METHOD OF DRIVING SOURCE IN LOCATION CONTROL

BACKGROUND OF THE INVENTION

In locating a control object such as a tool rest of a machine tool, the present invention relates to a method of decelerating a travel driving source of the control object.

To locate a control object, there has conventionally been employed a method which deceleratedly drives a moving driving source of the control object stepwise and stops the control object while allowing it to deceleratedly travel stepwise. However, this method involves a number of problems.

In locating the control object by means of numeric control, for example, locating of the control object is carried out stepwise on the basis of a decelerated travel zone (hereinafter referred to as the deceleration zone) of the control object which is determined in consideration of various characteristics such as a travelling speed of the control object before deceleration, its scheduled moving quantity and the like, and also on the basis of the speed of the control object within the deceleration zone.

According to this prior art method, when the control object reaches the deceleration zone, that is, a first deceleration point, the control object is allowed to travel while being applied with brake by a driving source which is deceleratedly driven by a first stage deceleration instruction, and even when the speed of the control object reaches the first stage deceleration speed, the control object is caused to make uniform motion for a while at the deceleration speed before it reaches a second deceleration point. Thereafter, the decelerated travel required for stopping the control object is repeated in the same way till location control of the control object is realized finally. Hence, this method needs a long period of time before deceleration and stop of the control object are attained in practice. Especially because the control object is allowed to make uniform motion in each deceleration zone at the deceleration speed inherent to each zone, this constitutes one of the main factors that prolong the time required for the location control.

The reason why the stepwise deceleration is generally required as the indispensable element in the location control is that inertias of the control object caused to travel before each deceleration zone, of its driving source and of transmission mechanisms associated with the driving source (e.g., reduction gears and feed screws) must be reduced stepwise so as to reduce or eliminate strain occurring in these mechanical elements, to prevent damage and abrasion of the machine and to improve the location accuracy. However, even according to such a method, it is practically difficult to obtain sufficient effects in preventing damage of the machine and in improving the location accuracy.

Incidentally, from the viewpoint of the prevention of damage of the machine and of the improvement in the location accuracy, there have conventionally been applied various improvements to the machine such as, for example, improvement of the rigidity of the machine itself and use of a ball screw nut in the feed mechanism to minimize the strain occurring during deceleration, but such measures do not function as effective means for preventing damage and abrasion of the machine or fluctuation of the location accuracy due to the stress or strain that occur during the deceleration travel of the machine in the location control.

The inventor of this invention has made intensive studies and experiments to clarify why damage and abrasion of the machine and fluctuation in the location accuracy such as mentioned above occur in the location control and has now found that there is a significant factor in the conventional method of decelerating the driving source for the control object.

In other words, in accordance with the conventional deceleration method, when the control object reaches a given deceleration zone, a control signal is impressed to the driving source to travel the control object in said deceleration zone and to gradually decelerate the control object. Even when the control object attains a predetermined speed of the first deceleration zone, the output of the driving source is maintained as such and the control object is allowed for a while to make uniform motion at the deceleration speed till it reaches the second deceleration zone. Thereafter, the driving source is subjected to the deceleration control in the same way so that the control object, which is sequentially allowed to make uniform motion in the preceeding deceleration zone, is allowed to travel in the state of the same deceleration travel in each of the subsequent deceleration zones. Consequently, at the start of the deceleration in each deceleration zone, there are occurring inertias in the control object, in the driving source allowed to keep such output as to let the control object travel at the predetermined uniform speed and also in the transmission mechanism connecting the control object to the driving source. These inertias occur along with the travel of the control object at the uniform speed in the preceeding deceleration zone and act on the control object, the driving source and the transmission mechanism, thus causing strain of the machine. It has been found that this strain exerts a significant influence on the damage and abrasion of the machine and on the location accuracy. This strain occurs when the control object is caused to travel at the uniform speed by means of the output of the driving source. In other words, since the control object is constantly caused to travel at the uniform speed and at the acceleration (deceleration) or to stop, the strain always occurs in the control object or mechanisms associated with the control object when its travelling state is controlled.

SUMMARY OF THE INVENTION

In the conventional location control as described above, the present invention is directed to provide a method of decelerating the driving source for causing the deceleration travel of the control object at the point where the strain occurring in the control object or in mechanism associated with the control object becomes minimum.

In carrying out the location control of the control object by decelerating it over a suitable number of stages, the gist of the present invention resides in a method of decelerating the driving source of the control object in its location control, said method characterized in that after the driving source of the control object is driven by a deceleration signal, a control signal for deceleration or stop of the control object in a subsequent stage is fed to the driving source when the actual driving speed of the driving source reaches a driving speed as instructed by the deceleration signal and/or when the actual travelling speed of the control object, which is caused to travel deceleratedly by the driving source, reaches a moving speed as brought forth by the driving source which is driven as instructed by the deceleration instruction signal.

DESCRIPTION OF THE PREFERRED EMBODIMENT

The location control in accordance with the method of the present invention will now be explained in comparison with an example of the location control according to the conventional method.

Figure 1:
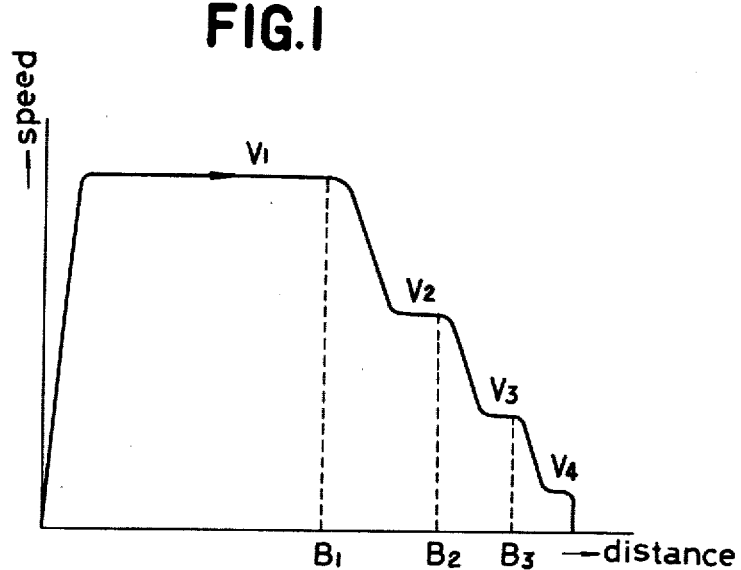
FIG. 1 is a speed diagram in accordance with a conventional method.

FIG. 1 is a speed diagram in the location control in accordance with the conventional method. As can be seen from this diagram, in the conventional method, a control signal is impressed to a travel driving source so as to let the control object travel at a first deceleration speed $V_2$ when the control object travelling at a speed $V_1$ reaches a first deceleration point $B_1$. Hence, the control object is gradually decelerated within the first deceleration zone till its speed becomes $V_2$. However, the control object is caused to travel uniformly for a while at the uniform speed $V_2$, which is the speed of this zone, till it reaches a second deceleration point $B_2$.

When the control object reaches the second deceleration point $B_2$, a control signal is then impressed to the driving source so as to allow the control signal to travel at the second deceleration speed $V_3$ whereby the control object is gradually decelerated till its speed becomes the second deceleration speed $V_3$. While keeping its speed at $V_3$ by means of the output of the driving source, the control object is caused to travel towards a third deceleration point. Thereafter, the control object is caused to travel in the same way and then stopped finally.

Figure 2:
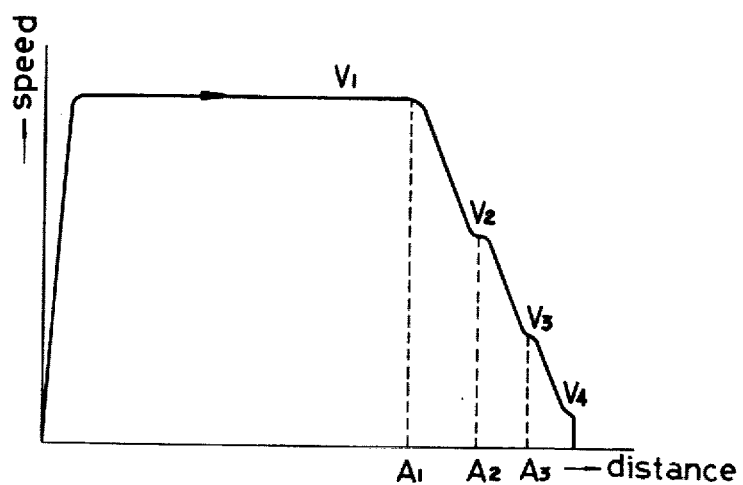
FIG. 2 is a speed diagram in accordance with the present invention.

The speed diagram in FIG. 2 shows an example of the location control of the control object which is caused to travel by the driving source to which the deceleration method in accordance with the present invention is applied.

As can be seen from this diagram, in accordance with the method of the present invention, the control object is not caused to make uniform motion in each deceleration zone. This alone provides the advantage in that the time required for the location control can be made shorter in comparison with the abovementioned conventional method. Moreover, if the method of the present invention is employed to realize this advantage, it is possible to enhance the deceleration efficiency and to substantially eliminate fluctuation in locating the control object because a control signal for the deceleration travel in the subsequent stage is applied as input to the driving source at the timing where the strain occurring in the control object, which is allowed to travel while being decelerated in the preceeding deceleration zone, and in the associated mechanism becomes minimum.

Explanation will be given on the timing where the strain occurring in the control object, which is under the deceleration travel, and also in the associated mechanism becomes minimum, with reference to FIG. 2. This timing can be detected by detecting the point, where the output of the driving source (the number of revolution in the case of a motor) under the drive control so as to let the control object travel at the first deceleration speed $V_2$ in the first deceleration zone, reaches a driving speed actually corresponding to the speed $V_2$, the point where the control object, which is in the deceleration travel, actually reaches the deceleration speed $V_2$ or the point where both of the driving source and the control object reach the respective speed of revolution and travelling speed $V_2$.

On the other hand, the deceleration point at which the abovementioned strain becomes minimum can optionally be set in advance on the basis of various data such as the torque ratio and the inertia ratio between the driving source varying from machine to machine to be controlled and the control object caused to travel by the output of the driving source, the travelling speed of the control object, the coefficient of friction between the control object and its travelling mechanism and the like. If the deceleration point of the control object is set in advance within a schedule travel distance on the basis of the abovementioned data, it is possible to control the travelling speed of the control object to an optionally set deceleration speed when it reaches this deceleration point. Thus, the method of the present invention can be adapted to the location control by feeding a deceleration drive control signal of a subsequent stage to the driving source for the control object, which is to reach the predetermined deceleration point, on the basis of the timing data representative of the minimum strain.

Figure 3:
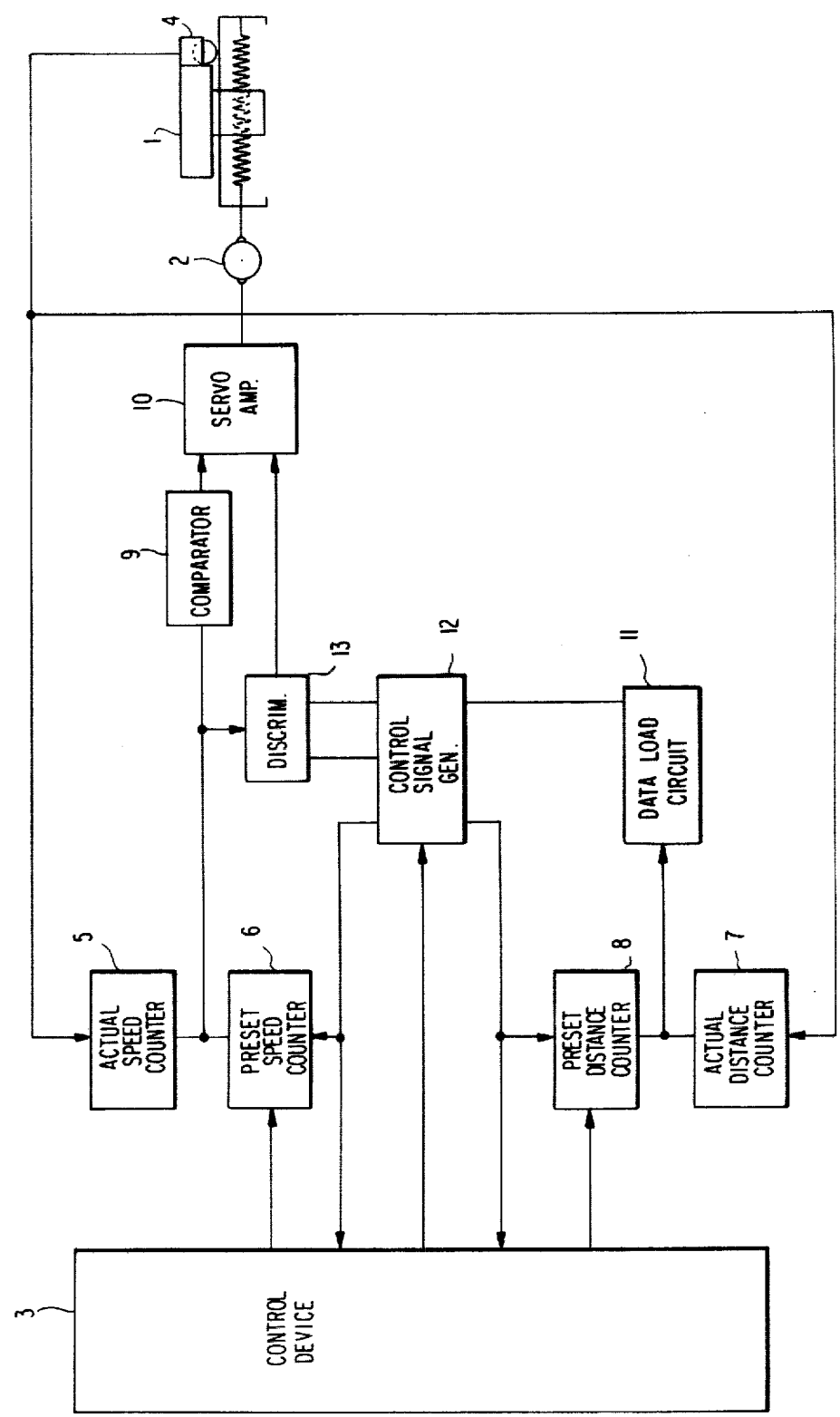
FIG. 3 is a block diagram showing the embodiment of the present invention.

Next, the embodiment of the present invention will be explained more definitely by referring to FIG. 3.

Reference numeral 1 represents a control object subjected to the location control in accordance with the method of the present invention such as a tool rest, for example, and reference numeral 2 does a bidirectional servo motor as a travel driving source for the control object 1. Reference numeral 3 represents a numeric control device which sets and instructs the operating conditions of the control object 1 such as its travelling speed, its travelling distance or its travelling direction and reference numeral 4 represents a measuring machine which generates pulse signals in accordance with the unit travelling distance of the control object, e.g., 100 pulses per mm distance, and is fitted to the control object 1. Reference numeral 5 represents a speed detection counter which counts the number of pulses fed from the measuring machine 4 as the pulse number per unit time when the control object 1 is caused to travel and this counter also detects the actual travelling speed of the control object 1. Reference numeral 6 represents a speed present counter which sets the travelling speed of the control object 1 in the pulse number having the same unit as the counting unit of the abovementioned speed detection counter 5, and reference numeral 7 represents a distance detection counter which counts the number of pulses fed from the measuring machine 4 when the control object 1 is caused to travel, and detects the current position (the travelling distance from the starting point) of the control object 1. Reference numeral 8 represents a distance preset counter which sets the scheduled travelling distance of the control object in the number of pulses having the same unit as the counting unit of the abovementioned distance detection counter and reference numeral 9 represents a comparison circuit which is actuated on the basis of a comparison operation value between the numeric value of the speed detection counter 5 and that of the speed detection preset counter 6 and feeds a control signal for the speed control to a servo amplifier 10. Reference numeral 11 represents a load circuit which supplies a control signal generating circuit 12 with a signal relating to a position at which the control object 1 is either to be decelerated or stopped on the basis of the comparison operation value between the numeric value of the distance detection counter 7 and that of the preset counter 8 for the counter 7. Reference numeral 13 represents a discrimination circuit which compares the difference of the numeric values between the speed detection counter 5 and the speed preset counter 6 with a speed tolerance signal fed from the abovementioned signal generation circuit 12 for the purpose of discrimination and when the difference of the numeric values exceeds the tolerance range, feeds an interrupt signal to the comparison circuit 9 thereby to directly supply the servo amplifier 10 with its control signal.

So long as no input is given from the data load circuit 11, the abovementioned signal generation circuit 12 feeds the speed tolerance signal to the discrimination circuit 13 but when the signal relating to the position is fed thereto from the data load circuit 11, it produces as output a signal for decelerating and stopping the control object 1. For example, when the numeric value of the distance detection counter 7 coincides with that of the distance preset counter 8 during travel of the control object 1 thereby to indicate the first deceleration point, the operation data signal instructing the first stage deceleration is fed from the data load circuit 11 to the signal generation circuit 12 whereby the signal generation circuit 12 feeds such a signal to the speed preset counter 6 that the counter 6 is numerically replaced with the first deceleration speed $V_2$.

In this instance, even when the numeric value of the speed preset counter 6 is replaced with the first stage deceleration speed, the numeric value that is being fed to the speed detection counter 5 is a numeric value which expresses the speed of the control object 1 immediately before or after the first stage deceleration so that there is a difference between the numeric value of the counter 5 and that of the counter 6. Hence, upon receiving the output from the comparison circuit 9 which is actuated by the difference of these numeric values, the servo amplifier 10 causes deceleration driving of the servo motor 2 so that the control object 1 is caused to travel towards the second deceleration point while being decelerated.

When the control object 1 reaches the second deceleration point, the numeric values of both counters 7 and 8 relating to the distance coincide with each other so that the signal generation circuit 12 is brought under such a state as to be able to generate a signal which replaces the speed preset counter 6 with the second stage deceleration speed $V_3$. On the other hand, substantially at the same time, the signal generation circuit 12 generates as output a signal replacing the preset counter 6 with the second stage deceleration speed $V_3$ by means of the signal fed from the discrimination circuit 13 to the signal generation circuit 12 and representing the coincidence of the numeric value of the preset counter 6 with that of the speed detection counter 5, that is, the signal representing the coincidence of the actual travelling speed of the control object 1 with the abovementioned first stage deceleration speed $V_2$.

Thereafter, the location control of the control object 1 is carried out in the same way by determining the timing at which the actual travelling speed of the control object coincides with the instruction signal and impressing a control signal relating to the deceleration driving at the subsequent stage or to stopping of the control object to the servo motor 2.

The timing of the decelerated driving of the driving source can also be detected with reference to the speed of revolution of the driving source in the manner to be described in addition to the detection at the point of coincidence of the actual travelling speed of the control object 1 with the scheduled speed. Namely, the point of coincidence can be detected by comparing the actual speed of revolution of the driving source with a speed of revolution to be rotated in accordance with a control signal. Alternatively, the point of coincidence of the control object and that of the driving source may be detected simultaneously.

As described in the foregoing paragraph, in carrying out the location control of the control object, the present invention brings the driving source under the decelerated driving control at such a timing where the strain occurring in the control object, which is being caused to travel deceleratedly, and in the asssociated mechanisms becomes minimum. The present invention enables not only to enhance the deceleration efficiency and to shorten the time required for the location control but also to reduce or eliminate the inertia and strain occurring in the moving body such as the control object during its deceleration. Accordingly, irrespective of deceleration within a short period of time, the location of the control object can be made while the inertia and strain of the control object immediately before its stop are minimized to almost zero, thereby making it possible to prevent damage and abrasion of the machine.

What is claimed is:

1. In a method of controlling the stepwise deceleration of a machine tool through a plurality of deceleration stages in which a signal representative of the velocity of the tool is derived from a pulse signal representative of the travel of the tool, the improvement comprising the application of the control signal for each deceleration stage at a time predetermined as a function of the strain occuring in the machine tool as a result of the control signal in the immediately preceding deceleration stage.

2. The method of claim 1 wherein the control signal for each stage is applied to the driving source at a time when the speed of the machine tool first reaches a predetermined value.

3. The method of claim 1 wherein the control signal for each stage is applied to the driving source when the speed of the driving source first reaches a predetermined value.

4. The method of claim 1 wherein the control signal for each stage is applied to the driving source when both the speed of the machine tool and the speed of the driving source first reach a predetermined value.

5. The method of claim 1 wherein the control signal for each stage is applied to the driving source at a predetermined time in advance of the minimum strain in the machine tool calculated on the basis of torque ratio and inertia ratio between the driving source and the machine tool, the velocity of the machine tool, the coefficient of friction between the machine tool and its travelling mechanism, and the like.

6. In a control circuit for the stepwise deceleration of a machine tool through a plurality of stages with a driving source, machine tool, machine tool position determining means, and driving source control signal generating means, the improvement wherein the driving source control signal generating means is activated for each deceleration stage in response to the strain in the machine tool as a result of the control signal for the immediately preceding stage.

* * * * *